United States Patent
Wuorinen et al.

(10) Patent No.: US 12,233,898 B2
(45) Date of Patent: Feb. 25, 2025

(54) VEHICLE FLOODING IDENTIFICATION AND PREVENTION

(71) Applicant: GM GLOBAL TECHNOLOGY OPERATIONS LLC, Detroit, MI (US)

(72) Inventors: Alec M. Wuorinen, Columbus, OH (US); Christopher L. Oesterling, Troy, MI (US); Alexander Bower, Grosse Pointe Farms, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 71 days.

(21) Appl. No.: 18/295,875

(22) Filed: Apr. 5, 2023

(65) Prior Publication Data
US 2024/0336273 A1    Oct. 10, 2024

(51) Int. Cl.
*B60W 50/14* (2020.01)
*B60W 30/14* (2006.01)
*B60W 40/06* (2012.01)
*B60W 50/00* (2006.01)
*B60W 60/00* (2020.01)
*H04W 4/46* (2018.01)

(52) U.S. Cl.
CPC .......... *B60W 50/14* (2013.01); *B60W 30/146* (2013.01); *B60W 40/06* (2013.01); *B60W 50/0097* (2013.01); *B60W 60/00182* (2020.02); *H04W 4/46* (2018.02); *B60W 2050/143* (2013.01); *B60W 2050/146* (2013.01); *B60W 2510/0638* (2013.01); *B60W 2510/081* (2013.01); *B60W 2555/20* (2020.02); *B60W 2555/60* (2020.02); *B60W 2556/50* (2020.02); *B60W 2556/65* (2020.02)

(58) Field of Classification Search
None
See application file for complete search history.

(56) References Cited

U.S. PATENT DOCUMENTS

2018/0312165 A1*   11/2018   Dudar ................... G06V 20/56
2020/0130622 A1*   4/2020    Lerner .................. B60R 21/01

* cited by examiner

*Primary Examiner* — Thomas S McCormack
(74) *Attorney, Agent, or Firm* — Quinn IP Law

(57) ABSTRACT

A method and system for assisting a vehicle when traveling within an area experiencing a meteorological event capable of potentially flooding a roadway is disclosed. The assistance may include determining a water level over top of the roadway, determining a plurality of surface water related operating parameters for the vehicle, and comparing the water level to the surface water related operating parameters to generate a flooded roadway assessment. The flooded roadway assessment may be used for determining the roadway to be in one of a passable state and an impassable state for the vehicle. Based thereon, a flooded roadway command may be generated for correspondingly controlling one or more systems onboard the vehicle.

20 Claims, 2 Drawing Sheets

VEHICLE FLOODING IDENTIFICATION AND PREVENTION

INTRODUCTION

The present disclosure relates to flooding identification and prevention, such as but not necessarily limited to providing preventative assistance when a vehicle may be approaching a roadway identified to be at least partially flooded.

A vehicle, such as an automobile or like, may travel upon a roadway within an area experiencing a meteorological event or other natural occurrence capable of potentially flooding the roadway with water, mud, or other flowing material. In contrast to the roadway being obstructed with static obstructions, such as broken down vehicles, trees, etc., where the source of the obstruction may be readily apparent, a flooded roadway may present greater difficulties for a driver to identify a scope or a severity of the flooding. The inability to accurately identify a seriousness of the flooding may result in the vehicle being stranded within the roadway should a driver incorrectly believe there to be a minimal amount of surface water or unnecessarily avoided should the driver incorrectly believe there to be more surface water than is actually present. This may be problematic as incorrectly assuming there to be less surface water may result in the vehicle becoming stranded, and conversely, incorrectly assuming there to be more surface water than is actually present may result in the vehicle unnecessarily seeking an alternative route when it could otherwise travel over the roadway without concern.

SUMMARY

One non-limiting aspect of the present disclosure relates to identifying a potentially flooded roadway and providing preventative actions to minimize a likelihood of the vehicle becoming stranded therein, and should the vehicle become stranded, preventative actions to maximize wellbeing of its occupants and cargo.

One non-limiting aspect of the present disclosure relates to a method for controlling a vehicle traveling within an area experiencing a meteorological event capable of potentially flooding a roadway. The method may include determining a water level over top of the roadway, determining a plurality of surface water related operating parameters for the vehicle, and comparing the water level to the surface water related operating parameters to generate a flooded roadway assessment. The flooded roadway assessment determining the roadway to be in one of a passable state and an impassable state for the vehicle. The method may include generating a flooded roadway command for controlling one or more systems onboard the vehicle according to the flooded roadway assessment.

The method may further include, in response to determining the passable state, generating the flooded roadway command to control an infotainment module onboard the vehicle to interface a passable alert with one or more occupants within the vehicle.

The method may further include generating the passable alert to apprise the occupants to proceed with caution when traveling over the roadway.

The method may further include generating the passable alert to apprise the occupants to unbuckle a seatbelt, roll down a window, open a sunroof, and/or open a door.

The method may further include, in response to determining the impassable state, generating the flooded roadway command to control an infotainment module onboard the vehicle to interface an impassable alert with one or more occupants within the vehicle.

The method may further include, in response to determining the impassable state and based on the water level, determining the vehicle to be in one of a submerged state and an unsubmerged state.

The method may further include, in response to determining the unsubmerged state, generating the impassable alert to apprise the occupants to avoid traveling over the roadway.

The method may further include, in response to determining the submerged state, generating the impassable alert to include one of an evacuate notification and a shelter notification, the evacuate notification instructing the occupants to exit the vehicle, the shelter notification instructing the occupants to remain within the vehicle.

The method may further include, generating the shelter notification to apprise the occupants to unbuckle a seatbelt and to roll down a window, open a sunroof, and/or open a door.

The method may further include, determining the unsubmerged state in response to the water level failing to surpass a water height threshold specified with the surface water related operating parameters and determining the submerged state in response to the water level surpassing the water height threshold.

The method may further include, in response to determining the impassable state, generating the flooded roadway command to control an autonomous module onboard the vehicle to avoid traveling over the roadway.

The method may further include, in response to determining the impassable state, generating the flooded roadway command to control a communication module onboard the vehicle to wirelessly transmit an impassable alert to one or more nearby vehicles.

The method may further include, in response to determining the impassable state, generating the flooded roadway command to control a communication module onboard the vehicle to wirelessly transmit an impassable alert to an emergency response entity offboard the vehicle.

One non-limiting aspect of the present disclosure relates to a system for preventing vehicle flooding when a vehicle is approaching a roadway within an area experiencing a meteorological event capable of potentially flooding the roadway. The system may include a water detection module configured for determining a water level over top of the roadway and a flooding prevention module. The flooding prevention controller may be configured for determining a plurality of surface water related operating parameters for the vehicle and comparing the water level to the surface water related operating parameters to generate a flooded roadway assessment. The flooded roadway assessment may determine the roadway to be in one of a passable state and an impassable state for the vehicle. The flooding prevention controller may be further configured for generating impassable instructions for directing the vehicle to avoid the roadway in response to determining the impassable state and generating passable instructions for directing the vehicle relative to the roadway in response to determining the passable state.

The impassable instructions may direct an autonomous module onboard the vehicle to autonomously navigate the vehicle to avoid the roadway by traveling according to an alternative route.

The passable instructions may direct the autonomous module to autonomously slow the vehicle below a posted speed limit while traveling over the roadway.

The impassable instructions direct an infotainment module onboard the vehicle to interface an impassable alert with one or more occupants inside the vehicle, the impassable alert advising the occupants to avoid the roadway.

The passable instructions may direct the infotainment module to interface a passable alert with one or more occupants inside the vehicle for advising the occupants to proceed cautiously and to unbuckle a seatbelt, roll down a window, open a sunroof, and/or open a door while traveling over the roadway.

One non-limiting aspect of the present disclosure relates to a system for assisting a vehicle stranded within a roadway due to an area experiencing a meteorological event causing flooding of the roadway. The system may include a water detection module configured for determining a water level over top of the roadway and a flooding prevention controller. The flooding prevention controller may be configured for determining a plurality of surface water related operating parameters for the vehicle, comparing the water level to the surface water related operating parameters to generate a flooded roadway assessment for determining the vehicle to be in one of a submerged state and an unsubmerged state, generating submerged instructions for directing one or more occupants within the vehicle to exit the vehicle in response to determining the submerged state, and generating unsubmerged instructions for directing the occupants to remain within the vehicle in response to determining the passable state.

The vehicle may include an engine or an electric motor configured to rotate at a rotational speed for purposes of propelling the vehicle and a positioning module configured for tracking a location of the vehicle. In response to determining the submerged state, the flooding prevention controller may be configured for comparing the rotational speed with changes in the location for determining the vehicle to be in in one of a floating state and a grounded state.

In response to determining the grounded state, the flooding prevention controller may estimate a future position for the vehicle and transmits the future position to emergency responders.

In response to determining the grounded state, the flood prevention controller may select a current position for the vehicle and transmits the current position to the emergency responders.

The submerged instructions may control an infotainment module included onboard the vehicle to interface a submerged alert with the occupants for directing the occupants to roll down a window, open a sunroof, and/or open a door and exit therethrough.

The unsubmerged instructions may control the infotainment module to interface an unsubmerged alert with the occupants for directing the occupants to roll down a window, open a sunroof, and/or open a door while remaining within the vehicle.

These features and advantages, along with other features and advantages of the present teachings, are readily apparent from the following detailed description of the modes for carrying out the present teachings when taken in connection with the accompanying drawings. It should be understood that even though the following figures and embodiments may be separately described, single features thereof may be combined to additional embodiments.

BRIEF DESCRIPTION OF THE DRAWINGS

The accompanying drawings, which are incorporated into and constitute a part of this specification, illustrate implementations of the disclosure and together with the description, serve to explain the principles of the disclosure.

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
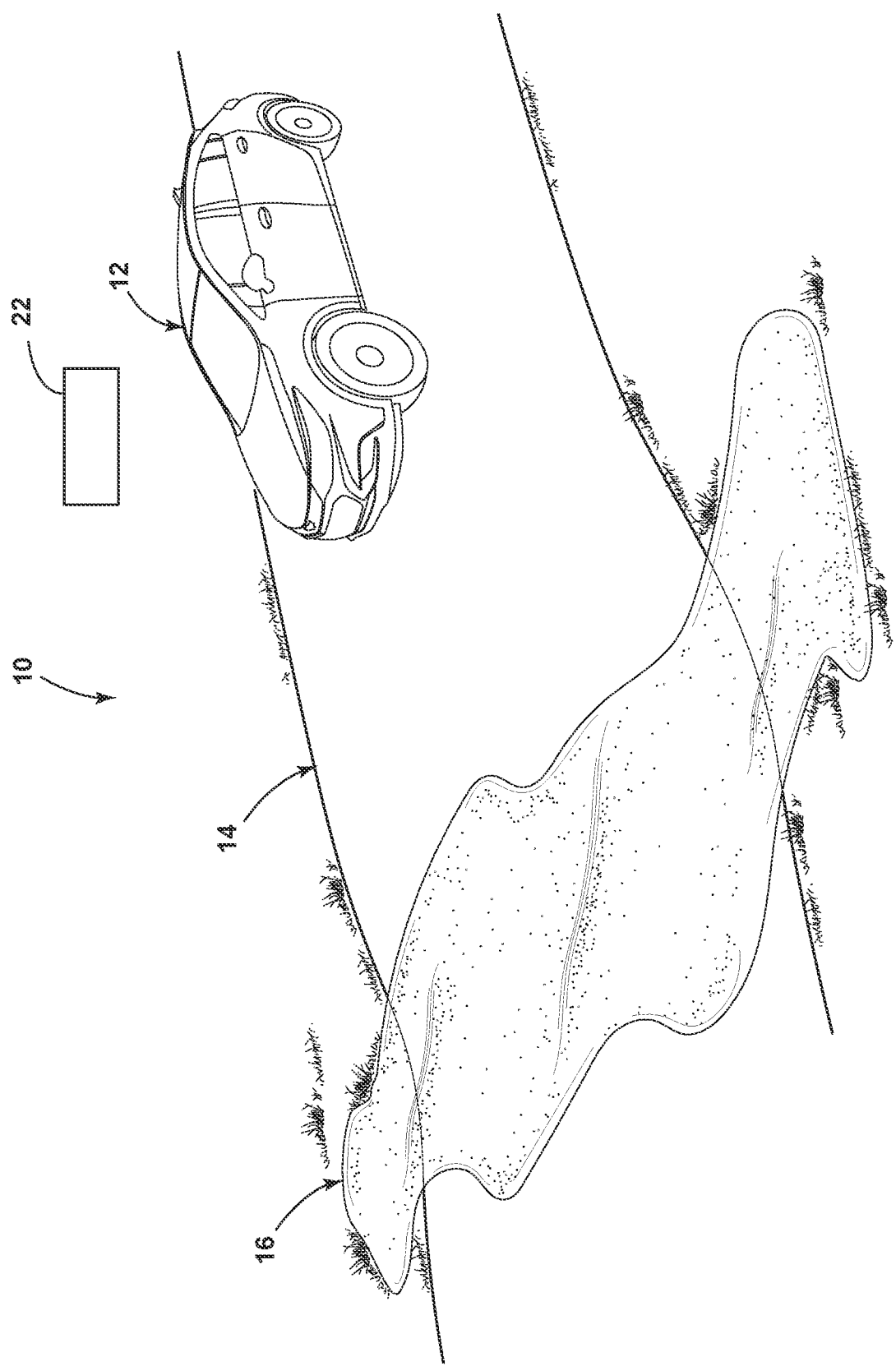
FIG. 1 illustrates a system for flooding identification and prevention in accordance with one non-limiting aspect of the present disclosure.

FIG. 1 illustrates a system for flooding identification and prevention in accordance with one non-limiting aspect of the present disclosure. The system 10 is illustrated for exemplary purposes with respect to assisting a vehicle 12 in identifying a roadway 14 having a potentially flooded portion 16. The system 10 may thereafter generate preventative actions that may be undertaken to minimize a likelihood of the vehicle 12 becoming stranded therein, and should the vehicle 12 become stranded, preventative actions that may be undertaken to maximize wellbeing of its occupants and cargo. The roadway 14 is illustrated for non-limited purposes to be at least partially covered with water, mud, or other flowing material of any nature that may present difficulties for a driver of the vehicle 12 to determine whether the flooded portion 16 may be reasonably traversed. The present disclosure predominantly refers to the portion 16 as being flooded to demonstrate one advantageous capability of the present disclosure to assist when a corresponding area may be experiencing a meteorological event capable of flooding the roadway 14 with water and the like such that it may be problematic for the driver to assess a depth, a scope, a severity, etc. of the flooding.

While the present disclosure is predominantly described with respect to the roadway 14 being flooded, one skilled in the art would readily recognize the system 10 being advantageous in identifying other types of obstacles or roadway impediments and correspondingly undertaking other types of preventative actions. The described use of the system 10 to facilitate identification and prevention when the vehicle 12 may be traveling along the roadway 14 in a direction towards the flooded portion 16 may be particularly useful due to the flooding potentially being somewhat transient and less persistent than other, more static or fixed obstacles. The flooding may also be representative of a type of impediment more commonly encountered by vehicles without the driver being adequately informed of ways to mitigate or address the obstacle, which may at times result in the driver attempting to traverse the flooded portion 16 to become stranded therein. The system 10 may be beneficially operable for identifying the flooded portion 16, providing preventative actions to be taken to avoid becoming stranded, and should stranding occur, preventative actions to be taken to maximize wellbeing of the occupants and cargo.

Figure 2:
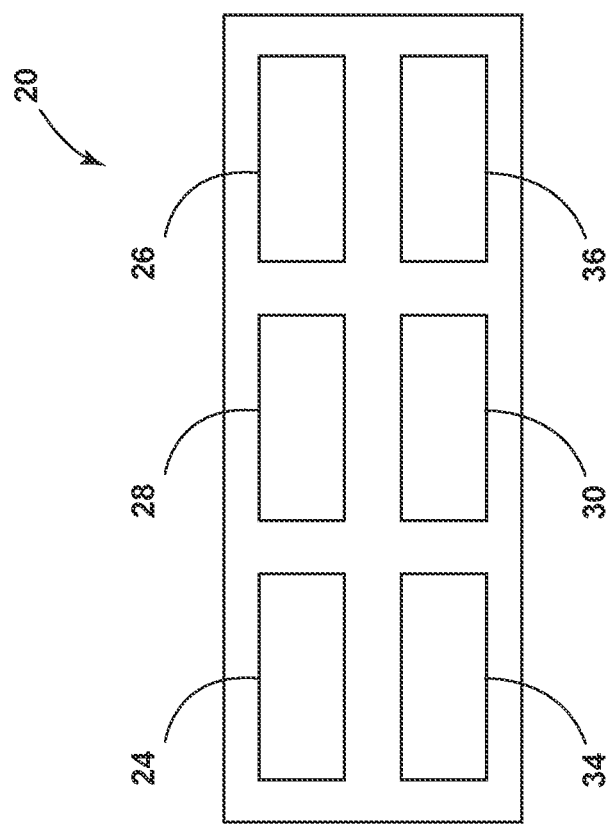
FIG. 2 illustrates a flooding prevention controller in accordance with one non-limiting aspect of the present disclosure.

FIG. 2 illustrates a flooding prevention controller 20 in accordance with one non-limiting aspect of the present disclosure. The flooding prevention controller 20 may be included onboard the vehicle 12 to identify the flooded portions 16 of the roadway 14 and to generate, undertake, implement, or otherwise facilitate various preventative actions. The flooding prevention controller 20 may be configured as componentry included onboard the vehicle 12 capable of operating according to processor execution of a plurality of non-transitory instructions stored on a computer-readable storage medium. The flooding prevention controller 20 may optionally be operable with elements offboard the vehicle 12, such as but not necessarily limited to a back office controller 22 shown in FIG. 1. The flooding prevention controller 20 may include a communications module 24 operable for facilitating wireless communications with the back office controller 22 and/or other devices offboard the vehicle 12, such as to facilitate vehicle-to-vehicle (V2V) communications with nearby vehicles in a wireless vicinity thereof. The communications module 24 may facilitate communications between the vehicle 12, the back office controller 22, and/or the nearby vehicles to support the flooding identification and prevention contemplated herein.

The flooding prevention controller 20 may include a water detection module 26. The water detection module 26 may be configured for identifying an amount or a water level of surface water over top of the roadway 14. In the event the flooding prevention controller 20 may be used for identifying other obstacles and impediments, the water detection module 26 may be correspondingly configured to facilitate the identification thereof. One non-limiting aspect of the present disclosure contemplates the water detection module 26 being operable with a water sensor (not shown) included onboard the vehicle 12. The water sensor may be configured to measure or otherwise assess a depth of water on the roadway 14 within a vicinity of the vehicle 12. The water detection module 26 may be additionally operable with sensors and monitoring devices offboard the vehicle 12 to ascertain characteristics of the surface water producing the flooded portion 16. This may include capabilities for interfacing via the communications module with sensors included along the roadway 14, satellite or radar imaging systems, etc. The back office controller 22 may optionally be configured to interface with flood detection systems offboard the vehicle 12 and report the data or other information associated therewith to the water detection module 26 onboard the vehicle 12.

The flooding prevention controller 20 may include an assessment module 28. The assessment module 28 may be configured to generate a flooded roadway assessment. The flooded roadway assessment may be based on the water level determined to be over top of the roadway 14 and a capability of the vehicle 12 to navigate therethrough. One non-limiting aspect of the present disclosure contemplates the assessment module 28 determining a plurality of surface water related operating parameters for the vehicle 12. The surface water related operating parameters may relate to capabilities of the vehicle 12 to navigate through and/or over surface water and other impediments. The surface water operating parameters, for example, may include metrics, values, data, and other information for representing: a quantity of doors, sunroofs, windows and/or seats; a current number of passengers or occupants; a ground clearance (e.g., a height threshold above which the vehicle 12 may be submerged and incapable of gaining traction); a curb weight; etc. The assessment module 28 may be additionally operable for determining a plurality of environmental conditions surrounding the flooding, such as a quantity of power lines down in the corresponding area, barometric pressure (e.g., measure whether a storm is increasing or decreasing), historical flooding of the roadway 14, etc.

The assessment module 28 may be configured to generate the flooded roadway 14 assessment based on comparing the water level to the surface water related operating parameters. The flooded roadway 14 assessment may be generated in this manner to determine the roadway 14 to be in one of a passable state and an impassable state for the vehicle 12. The roadway 14, for example, may be determined to be in the passable state as long as the water level is less than a water height threshold specified with the surface water related operating parameters. The water height threshold may vary depending on the type of vehicle 12, its ground clearance, and its other capabilities for traversing through the flooded portion 16, e.g., the water height threshold may be based on a combination of factors associated with the ground clearance, curb weight, etc. The roadway 14 may be determined to be in the passable state as long as the vehicle 12 may adequately pass through the flooded portion 16 without losing traction, water entering the passenger compartment, water covering the exhaust system or muffler, or the water otherwise being of a level likely to disrupt operation. The passable state determination may also be dependent on forecasts or predictions for the water level such that the flooded portion 16 may be deemed impassable even though it may be currently passable if the water level is expected to increase.

The flooding prevention controller 20 may include a command module 30 for generating a flooded roadway command depending on the passable or impassable state being determined. The flooded roadway command may be utilized for purposes of implementing the preventative actions. In the event the flooded portion 16 is determined to be in the passable state, the flooded roadway command may be communicated to an infotainment module 34 included as part of the flooding prevention controller 20 for controlling an infotainment system 10 onboard the vehicle 12. The infotainment module 34, for example, may be configured for generating a passable alert in response to the passable state being determined. The passable alert may be interfaced through the infotainment system 10 to apprise the vehicle 12 occupants of a location for the flooded portion 16, it being passable, and/or that the occupant should proceed with caution while traveling thereover. The passable alert may optionally include instructions for the passengers to unbuckle a seatbelt, roll down a window, open a sunroof, and/or open a door prior to entering the flooded portion 16 as a preventative measure. These preventative measures may be useful in providing occupants an avenue for exiting the vehicle 12 should the vehicle 12 become stranded or otherwise incapable of exiting the flooded portion 16.

The flooding prevention controller 20 may also include an autonomous system module 36 configured for controlling autonomous systems onboard the vehicle 12. The vehicle 12 may include multiple autonomous systems capable of being independently controlled, such as an autonomous drive system capable of autonomously or semi-autonomously navigating the vehicle 12 along the roadway 14 and/or other autonomous systems capable of automatically unbuckling a seatbelt, rolling down the window, opening a sunroof, and/or opening a door. In response to the passable determination, the flooded roadway 14 command may be interfaced with the autonomous system module 36 for generating the passable alert to also include autonomously implementing control over one or more vehicle subsystems, such as to autonomously slow down the vehicle 12 below a posted speed limit or to a speed otherwise deemed reasonable for the flooded portion 16. The autonomous system module 36 may optionally be configured to prevent the driver or other occupant from engaging in certain activities, such as by preventing occupants from closing the windows or preventing the driver from exceeding a desired speed.

In response to determining the flooded portion 16 to be in the impassable state, the command module 30 may correspondingly generate the flooded roadway command, such as to command the infotainment module 34 and/or the autonomous system module 36 to implement corresponding preventative actions. The infotainment module 34, for example, may utilize the command to generate an impassable alert. The impassable alert may be interfaced through the infotainment system to apprise the occupants of the flooded portion 16 being impassable and that the corresponding roadway 14 should be avoided, which may optionally include providing the occupants with instructions for an alternative route around the flooding. The impassable alert may also be interfaced through the autonomous system module 36 to facilitate controlling autonomous systems onboard the vehicle 12, such as by controlling a navigation system to autonomously navigate the vehicle 12 according to an alternative route that avoids the flooded portion 16, transmitting additional alerts and warnings through V2V communications to nearby vehicles, notifying the back office controller, notifying an emergency response entity, etc.

The determination of the roadway 14 being in an impassable or a passable state may be helpful in identifying the location of the flooded portion 16 and preventative actions to be implemented before approaching or attempting to traverse the flooded roadway 14. In the event the driver fails to heed the preventative actions or otherwise attempts to traverse the flooded portion 16, such as by ignoring the impassable alert, the vehicle 12 may become stranded. The vehicle 12 may be considered to be stranded within the flooded portion 16 in the event roadway traction is lost or otherwise insufficient for reliably maintaining drivability according to driver or autonomous controls. This may, for example, correspond with the vehicle 12 being stationary, incapable of moving on its own, or uncontrollably floating or flowing within the flooded portion 16. The assessment module may determine a lack of traction, for example, when a propulsion system 10 onboard the vehicle 12 fails to move the vehicle 12, e.g., an engine or an electric motor unsuccessfully attempting to move the vehicle 12 attaining rotations speed typically sufficient for propelling the vehicle 12 without a global positioning system 10 (GPS) onboard the vehicle 12 registering corresponding movement.

The assessment module 28 may be configured to determine the vehicle 12 to be in one of a submerged state and an unsubmerged state when stranded within the flooded portion 16. The determination of the impassable state may be a precursor for determining whether the vehicle 12 is in one of the submerged and unsubmerged states as it may be unlikely for the vehicle 12 to be submerged in the event the roadway 14 is in the passable state. The submerged state may be determined when the water height, a speed of movement, or other circumstance surpasses corresponding thresholds whereby it may be desirable or beneficial for the occupants to exit the stranded vehicle 12. The submerged state, for example, may be determined in the event the water sensor determines the sensor to be above a predetermined threshold or the GPS system 10 indicates the vehicle 12 to be moving (i.e., floating) while the propulsion system 10 is inactive or operating in a contrary manner. The unsubmerged state, in contrast, may correspond with conditions whereby the flooded portion 16 may be traversable on foot should the occupants exit the vehicle 12.

The assessment module 28 may be configured to generate the flooded roadway 14 command to include an identification for the submerged or unsubmerged state. The notification, for example, may include an evacuation notification or a shelter notification. The evacuation notification may include controlling the infotainment system to interface instructions with the occupants for exiting the vehicle 12, such as by exiting through a door, window, sunroof, hatch, etc. the evacuation notification may additionally include instructions for controlling the autonomous system 10 module to notify emergency response utilities of the occupants exiting the vehicle 12, shutting down vehicle 12 subsystems, etc. The shelter notification may include controlling the infotainment system to interface instructions to the occupant for remaining within the vehicle 12, such as by instructing the occupants to keep the doors closed while unbuckling their seatbelts and opening the windows and sunroof in case of the water level increasing. The shelter notification may additionally include instructions for controlling the autonomous system module 36 to notify emergency response utilities of the occupants sheltering within the vehicle 12, predicting or estimating future movement of the vehicle 12, etc.

Figure 3:
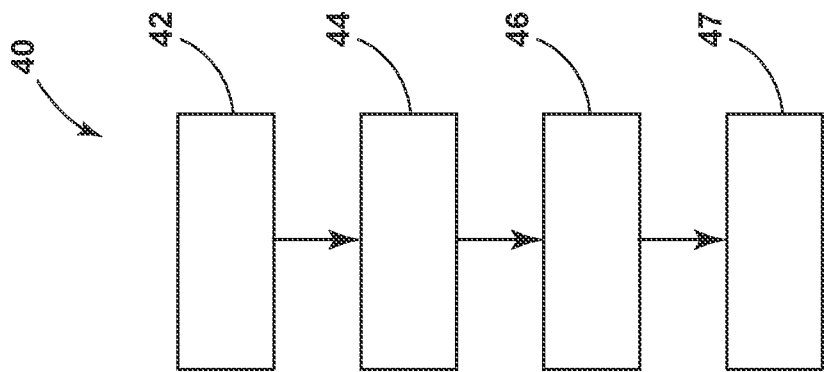
FIG. 3 illustrates a flowchart of a method for controlling a vehicle traveling within an area experiencing a meteorological event capable of potentially flooding a roadway in accordance with one non-limiting aspect of the present disclosure.

FIG. 3 illustrates a flowchart 40 of a method for controlling a vehicle 12 traveling within an area experiencing a meteorological event capable of potentially flooding a roadway 14 in accordance with one non-limiting aspect of the present disclosure. Block 42 relates to a water detection system 10 determining the water level over top of the roadway 14. Block 44 relates to the assessment module 28 determining a plurality of surface water related operating parameters for the vehicle 12. Block 46 relates to the assessment module 28 thereafter comparing the water level to the surface water related operating parameters to generate a flooded roadway assessment. The flooded roadway assessment may be useful for determining roadway 14 to being one of a passable state and an impassable state for the vehicle 12. Block 48 relates to generating a flooded roadway command for commanding one or more systems onboard the vehicle 12 according to the flooded roadway assessment. The generation of the flooded roadway command may include instructions, controls, etc. to facilitate interfacing alerts and notifications with vehicle occupants, emergency response utilities offboard the vehicle 12, and otherwise implementing other actions associated with autonomously controlling the vehicle 12 to facilitate identification and prevention of flooding related activities.

As supported above, the present disclosure relates to addressing problems of drivers and passengers panicking after being trapped in their vehicle, such as when power-windows may be inoperable during a flooding event. The disclosure may provide preventive and other types of actions to assist crises centers in monitoring for flash flood watches and warnings, vehicle emergency notification system, and back-office emergency services support. This disclosure supports: in-vehicle emergency prevention via an emergency response crises centers monitoring for flash flood watches and warnings; flood identification built into the vehicle; automatic in-vehicle support response after flooding event in a vehicle has been identified; auditory and visual communication of emergency flood response instructions, e.g., leveraging the existing vehicle systems, display screens, vehicle connectivity hardware, etc.; tailored emergency response based on how many passengers are in the vehicle, which may be determined by weight seat-sensors and notification of seats with seatbelts still buckled; operability with window-lowering device designed for use during power outages; identification of vehicles within the potential risk areas and higher risk precise locations (like next to river); sending reminders of flood response and tool usage, even in non-warning times, if driver lives in higher flood-risk areas; ability to do routing away from high-flood-prone areas; leveraging the vehicle GPS to identify how fast the vehicle is moving, i.e., to determine if it has started floating downstream or in floodwaters, in order to triangulate the vehicle location for emergency response teams.

One non-limiting aspect of the present disclosure contemplates a water detection system having and/or being operable with a water sensor configured for sensing water over the roadway. The water sensor may be installed on the outside of the vehicle, such as at approximately 18" off the ground to be triggered after being submerged in water for approximately 30 seconds based on location of vehicle. The water sensors may be configured for feeding flood data to the communication module. The communication module may be configured for generating reminders of flood response, even in non-warning times if a driver lives in higher risk areas, collecting vehicle data, including the number of passengers in the vehicle (as determined by the in-seat weight sensors and GPS location), alerting an emergency response advisor, and/or feeding data to the emergency response advisor, including the number of passengers in the vehicle, seatbelt buckled status, the GPS location of the vehicle, and the vehicle characteristics (make, model, year, etc.). The back office controller may be configured to operate as or interface with an emergency response utility to proactively monitor for flash flood watches and warnings, receive flood notification from the vehicle connectivity module, contact responders, communicate emergency response protocols to the vehicle occupants, feeds known information to the authorities to support saving the vehicle occupants, etc.

One non-limiting aspect of the present disclosure contemplates a vehicle may be driving in heavy rain such that it drives through a large puddle that triggers the humidity sensor and/or water sensor. A 'Flooded Street' notification may be correspondingly transmitted to the back office controller, which over time, identifies high-risk areas. The 'Flooded Street' notification may be pushed to active vehicles in the area. Vehicles in the area receive a notification of a high-water alert via audio and through display screens. If the an alert is transmitted to a sedan, which may operate poorly in water), it may be identified as currently being routed through the flooded street. An alert may be correspondingly pushed through via audio and through display screens, and if existing vehicle routing is through a flooded street, navigation may be re-calculated. In the event the alert is transmitted to a pickup truck, which may operate well in certain amounts of water, it may be identified as currently being routed through the flooded street. An alert may be pushed through via audio and through display screens, and if existing vehicle routing is through a flooded street, an alternate route may be proposed. If the driver chooses to continue through flood waters, an alert of how to respond in case of rising flood water may be played (e.g., "Avoid the area, but if you become stranded "this is what you have to do").

One non-limiting aspect of the present disclosure contemplates generating and/or maintaining emergency response accounts for information provided and information pulled from the vehicle. The account may identify how many passengers may be in the vehicle, whether there are any infants, elderly, mobility limited individuals, etc.; whether the vehicle is equipped with a window smashing device; whether the door/window can be opened, whether the occupants can swim, and/or estimates for time of arrival and distance from emergency response utilities. Similarly, an alert for "Slippery road ahead; reduce speed!" may be played through via audio and through display screens, with the benefits of being able to promote behavior of vehicle occupants via tailored instructions. The instructions may be used, for example, to prevent panic during a flooding event, provide crisis information visually and audially, tailor emergency response based on condition of vehicle, location of the vehicle, and information provided regarding the passengers, and to provide solutions that work regardless of availability power (or lack thereof) with a wide variety and type of vehicle.

The terms "comprising", "including", and "having" are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term "or" includes any one and all combinations of the associated listed items. The term "any of" is understood to include any possible combination of referenced items, including "any one of" the referenced items. "A", "an", "the", "at least one", and "one or more" are used interchangeably to indicate that at least one of the items is present. A plurality of such items may be present unless the context clearly indicates otherwise. All numerical values of parameters (e.g., of quantities or conditions), unless otherwise indicated expressly or clearly in view of the context, including the appended claims, are to be understood as being modified in all instances by the term "about" whether or not "about" actually appears before the numerical value. A component that is "configured to" perform a specified function is capable of performing the specified function without alteration, rather than merely having potential to perform the specified function after further modification. In other words, the described hardware, when expressly configured to perform the specified function, is specifically selected, created, implemented, utilized, programmed, and/or designed for the purpose of performing the specified function.

While various embodiments have been described, the description is intended to be exemplary, rather than limiting and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims. Although several modes for carrying out the many aspects of the present teachings have been described in detail, those familiar with the art to which these teachings relate will recognize various alternative aspects for practicing the present teachings that are within the scope of the appended claims. It is intended that all matter contained in the above description or shown in the accompanying drawings shall be interpreted as illustrative and exemplary of the entire range of alternative embodiments that an ordinarily skilled artisan would recognize as implied by, structurally and/or functionally equivalent to, or otherwise rendered obvious based upon the included content, and not as limited solely to those explicitly depicted and/or described embodiments.

What is claimed is:

1. A method for controlling a vehicle traveling within an area experiencing a meteorological event capable of potentially flooding a roadway, comprising:
   determining a water level over top of the roadway;
   determining a plurality of surface water related operating parameters for the vehicle;
   comparing the water level to the surface water related operating parameters to generate a flooded roadway assessment, the flooded roadway assessment determining the roadway to be in one of a passable state and an impassable state for the vehicle;
   generating a flooded roadway command for controlling one or more systems onboard the vehicle according to the flooded roadway assessment; and
   in response to determining the passable state, generating the flooded roadway command to control an infotainment module onboard the vehicle to interface a passable alert with one or more occupants within the vehicle.

2. The method according to claim 1, further comprising:
   generating the passable alert to apprise the occupants to proceed with caution when traveling over the roadway.

3. The method according to claim 2, further comprising:
   generating the passable alert to apprise the occupants to unbuckle a seatbelt, roll down a window, open a sunroof, and/or open a door.

4. The method according to claim 1, further comprising:
   in response to determining the impassable state, generating the flooded roadway command to control an infotainment module onboard the vehicle to interface an impassable alert with one or more occupants within the vehicle.

5. The method according to claim 4, further comprising:
   in response to determining the impassable state and based on the water level, determining the vehicle to be in one of a submerged state and an unsubmerged state.

6. The method according to claim 5, further comprising:
   in response to determining the unsubmerged state, generating the impassable alert to apprise the occupants to avoid traveling over the roadway.

7. The method according to claim 5, further comprising:
   in response to determining the submerged state, generating the impassable alert to include one of an evacuate notification and a shelter notification, the evacuate notification instructing the occupants to exit the vehicle, the shelter notification instructing the occupants to remain within the vehicle.

8. The method according to claim 7, further comprising:
   generating the shelter notification to apprise the occupants to unbuckle a seatbelt and to roll down a window, open a sunroof, and/or open a door.

9. The method according to claim 8, further comprising:
   determining the unsubmerged state in response to the water level failing to surpass a water height threshold specified with the surface water related operating parameters; and
   determining the submerged state in response to the water level surpassing the water height threshold.

10. The method according to claim 1, further comprising:
    in response to determining the impassable state, generating the flooded roadway command to control an autonomous module onboard the vehicle to avoid traveling over the roadway.

11. The method according to claim 1, further comprising:
    in response to determining the impassable state, generating the flooded roadway command to control a communication module onboard the vehicle to wirelessly transmit an impassable alert to one or more nearby vehicles.

12. The method according to claim 1, further comprising:
    in response to determining the impassable state, generating the flooded roadway command to control a communication module onboard the vehicle to wirelessly transmit an impassable alert to an emergency response entity offboard the vehicle.

13. A system for preventing vehicle flooding when a vehicle is approaching a potentially flooded roadway, comprising:
    a water detection module configured for determining a water level over top of the roadway;
    a flooding prevention module configured for:
    determining a plurality of surface water related operating parameters for the vehicle;
    comparing the water level to the surface water related operating parameters to generate a flooded roadway assessment, the flooded roadway assessment determining the roadway to be in one of a passable state and an impassable state for the vehicle;
    generating impassable instructions for directing the vehicle to avoid the roadway in response to determining the impassable state; and
    generating passable instructions for directing the vehicle relative to the roadway in response to determining the passable state;
    wherein the impassable instructions direct an autonomous module onboard the vehicle to autonomously navigate the vehicle to avoid the roadway by traveling according to an alternative route; and
    wherein the passable instructions direct the autonomous module to autonomously slow the vehicle below a posted speed limit while traveling over the roadway.

14. The system according to claim 13, wherein:
    the impassable instructions direct an infotainment module onboard the vehicle to interface an impassable alert with one or more occupants inside the vehicle, the impassable alert advising the occupants to avoid the roadway; and
    the passable instructions direct the infotainment module to interface a passable alert with one or more occupants inside the vehicle, the passable alert advising the occupants to proceed cautiously and to unbuckle a seatbelt, roll down a window, open a sunroof, and/or open a door while traveling over the roadway.

15. A system for assisting a vehicle stranded within a flooded roadway, comprising:
    a water detection module configured for determining a water level over top of the roadway;
    a flooding prevention controller configured for:
    determining a plurality of surface water related operating parameters for the vehicle;
    comparing the water level to the surface water related operating parameters to generate a flooded roadway assessment, the flooded roadway assessment determining the vehicle to be in one of a submerged state and an unsubmerged state;

generating submerged instructions for directing one or more occupants within the vehicle to exit the vehicle in response to determining the submerged state; and generating unsubmerged instructions for directing the occupants to remain within the vehicle in response to determining the unsubmerged state;

wherein:

the vehicle includes:

an engine or an electric motor configured to rotate at a rotational speed for purposes of propelling the vehicle; and a positioning module configured for tracking a location of the vehicle; and wherein, in response to determining the submerged state, the flooding prevention controller is configured for:

comparing the rotational speed with changes in the location for determining the vehicle to be in in one of a floating state and a grounded state.

16. The system according to claim 15, wherein:

in response to determining the grounded state, the flooding prevention controller estimates a future position for the vehicle and transmits the future position to emergency responders; and in response to determining the grounded state, the flood prevention controller selects a current position for the vehicle and transmits the current position to the emergency responders.

17. The system according to claim 15, wherein:

the submerged instructions control an infotainment module included onboard the vehicle to interface a submerged alert with the occupants, the submerged alert directing the occupants to roll down a window, open a sunroof, and/or open a door and exit therethrough; and the unsubmerged instructions control the infotainment module to interface an unsubmerged alert with the occupants, the unsubmerged alert directing the occupants to roll down a window, open a sunroof, and/or open a door while remaining within the vehicle.

18. The system according to claim 13, further comprising:

in response to determining the impassable state, generating the flooded roadway command to control an autonomous module onboard the vehicle to avoid traveling over the roadway.

19. The system according to claim 13, further comprising:

in response to determining the impassable state, generating the flooded roadway command to control a communication module onboard the vehicle to wirelessly transmit an impassable alert to one or more nearby vehicles.

20. The system according to claim 13, further comprising:

in response to determining the impassable state, generating the flooded roadway command to control a communication module onboard the vehicle to wirelessly transmit an impassable alert to an emergency response entity offboard the vehicle.

\* \* \* \* \*